(12) United States Patent
Hung

(10) Patent No.: US 10,391,822 B2
(45) Date of Patent: Aug. 27, 2019

(54) METHOD FOR MONITORING TIRE CONDITION

(71) Applicant: MOBILETRON ELECTRONICS CO., LTD., Taichung (TW)

(72) Inventor: Wen-Chuan Hung, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 182 days.

(21) Appl. No.: 15/584,814

(22) Filed: May 2, 2017

(65) Prior Publication Data

US 2017/0320363 A1 Nov. 9, 2017

(30) Foreign Application Priority Data

May 6, 2016 (TW) .............................. 105114074 A

(51) Int. Cl.
*B60C 23/04* (2006.01)
*B60C 23/06* (2006.01)
*B60C 19/00* (2006.01)

(52) U.S. Cl.
CPC ...... *B60C 23/0416* (2013.01); *B60C 23/0435* (2013.01); *B60C 23/0459* (2013.01);
(Continued)

(58) Field of Classification Search
None
See application file for complete search history.

(56) References Cited

U.S. PATENT DOCUMENTS 7,203,579 B2 * 4/2007 Yokota ................ B60C 23/0477
303/150
8,019,502 B2 * 9/2011 Brusarosco ........... B60C 23/064
340/443

(Continued)

FOREIGN PATENT DOCUMENTS

CN 1608012 A 4/2005
CN 104924864 A 9/2015
(Continued)

OTHER PUBLICATIONS

Examination report for TW105114074, dated Dec. 29, 2016, Total of 9 pages.

(Continued)

*Primary Examiner* — Peter J Macchiarolo
*Assistant Examiner* — Jermaine L Jenkins
(74) *Attorney, Agent, or Firm* — Tracy M. Heins; Apex Juris, pllc.

(57) ABSTRACT

A method for monitoring a tire condition includes the following steps: sense a rotational speed of a tire of a moving vehicle via at least one monitoring device of a wireless monitoring system disposed in the vehicle; when the sensed rotational speed reaches a predetermined rotational speed range, obtain a condition of the rotating tire through at least one monitoring device to generate first condition data; compare the first condition data with a plurality of pavement feature data to obtain the corresponding pavement feature data; process with the obtained pavement feature data and the first condition data to filter a pavement feature out of the first condition data, generating second condition data; determine whether the condition of the tire is abnormal based on the second condition data; and send out a warning message when the condition of the tire is determined as being abnormal.

12 Claims, 6 Drawing Sheets

(52) U.S. Cl.
CPC ...... *B60C 23/0486* (2013.01); *B60C 23/0488* (2013.01); *B60C 23/0489* (2013.01); *B60C 23/06* (2013.01); *B60C 2019/004* (2013.01)

(56) References Cited

U.S. PATENT DOCUMENTS

| | | | |
|---|---|---|---|
| 8,332,092 B2 * | 12/2012 | Laermer | ............... B60C 23/064 340/443 |
| 9,434,217 B2 * | 9/2016 | Mori | ................... B60C 23/0416 |
| 9,873,293 B2 * | 1/2018 | Singh | .................. B60C 23/0408 |
| 10,112,444 B2 * | 10/2018 | Takahashi | ............. B60C 11/246 |
| 2002/0059826 A1 | 5/2002 | Ono et al. | |

FOREIGN PATENT DOCUMENTS

| | | |
|---|---|---|
| CN | 105437880 A | 3/2016 |
| EP | 1457388 A1 | 9/2004 |
| JP | 2003320826 A | 11/2003 |
| JP | 2004067009 A | 3/2004 |
| TW | I319360 B | 1/2010 |
| TW | I453389 B | 9/2014 |
| TW | M487852 U | 10/2014 |

OTHER PUBLICATIONS

Search report for TW105114074, dated Dec. 29, 2016, Total of 2 pages.
English Abstract for CN104924864, Total of 1 page.
English Abstract for CN105437880, Total of 1 page.
English Abstract for TWI319360, Total of 1 page.
English Abstract for TWM487852, Total of 1 page.
English Abstract for JP2003320826, Total of 1 page.
English Abstract for JP2004067009, Total of 1 page.
Chinese Office Action for 201610329698.0, dated Oct. 23, 2018, Total of 7 pages.

* cited by examiner

METHOD FOR MONITORING TIRE CONDITION

BACKGROUND OF THE INVENTION

Technical Field

The present invention generally relates to tire monitoring, and more particularly to a method for monitoring the condition of a tire during the running of a motor vehicle.

Description of Related Art

Typically, a conventional wireless monitoring system, including a plurality of sensors and a receiver, is adapted to sense tire pressure or tire temperature. The sensors are provided respectively at each tire of the vehicle. The sensors are adapted to sense tire pressure or tire temperature, and send the sensed tire pressure or tire temperature to the receiver. By receiving the information sent by the sensors, the receiver is adapted to monitor tire pressure or tire temperature. The receiver could raise an alarm to prevent an accident once tire pressure or tire temperature is found to be abnormal.

However, the conventional wireless monitoring system can only monitor tire pressure or tire temperature. In all aspects, adding in additional functions and providing higher security has become a trend for manufacturers.

BRIEF SUMMARY OF THE INVENTION

In view of the reasons mentioned above, the primary objective of the present invention is to provide a method for monitoring a tire condition, which could determine whether the tire is abnormal by detecting the condition of a tire while it is running.

The present invention provides a method for monitoring a condition of each of at least one tire of a moving vehicle via a wireless monitoring system disposed in the vehicle, wherein the wireless monitoring system includes at least one monitoring device and a receiver; wherein each one of the at least one monitoring device corresponds to each one of the at least one tire and wherein the corresponding at least one monitoring device is disposed at the at least one tire, and wherein the receiver is disposed in a vehicle body of the vehicle. The method includes the following steps: A. sense a rotational speed of the at least one tire of the moving vehicle via the at least one monitoring device; B. generate first condition data for the at least one tire by sensing the condition of the at least one tire through the at least one monitoring device for a predetermined period once the sensed rotational speed reaches and stays in a predetermined rotational speed range, and stop sensing the condition of each of the at least one tire after the predetermined period, wherein the first condition data contains a pavement feature; C. transmit the first condition data from the at least one monitoring device to the receiver; D. compare the first condition data of the at least one tire with a plurality of pavement feature data stored in a database to obtain one of the pavement feature data which corresponds to said first condition data, wherein each of the pavement feature data corresponds to one of a plurality of types of pavements; E. filter the pavement feature out of the first condition data based on the obtained pavement feature data to generate second condition data for each of the at least one tire; and F. determine whether the condition of the at least one tire is abnormal based on the generated second condition data, and send out a warning message to a user once the condition of the at least one tire is determined as abnormal.

With the aforementioned design, by filtering out the pavement features, the original data about the condition of the rotating tire sensed by the monitoring device could be obtained to accurately determine whether the condition of the rotating tire is abnormal to provide higher security.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
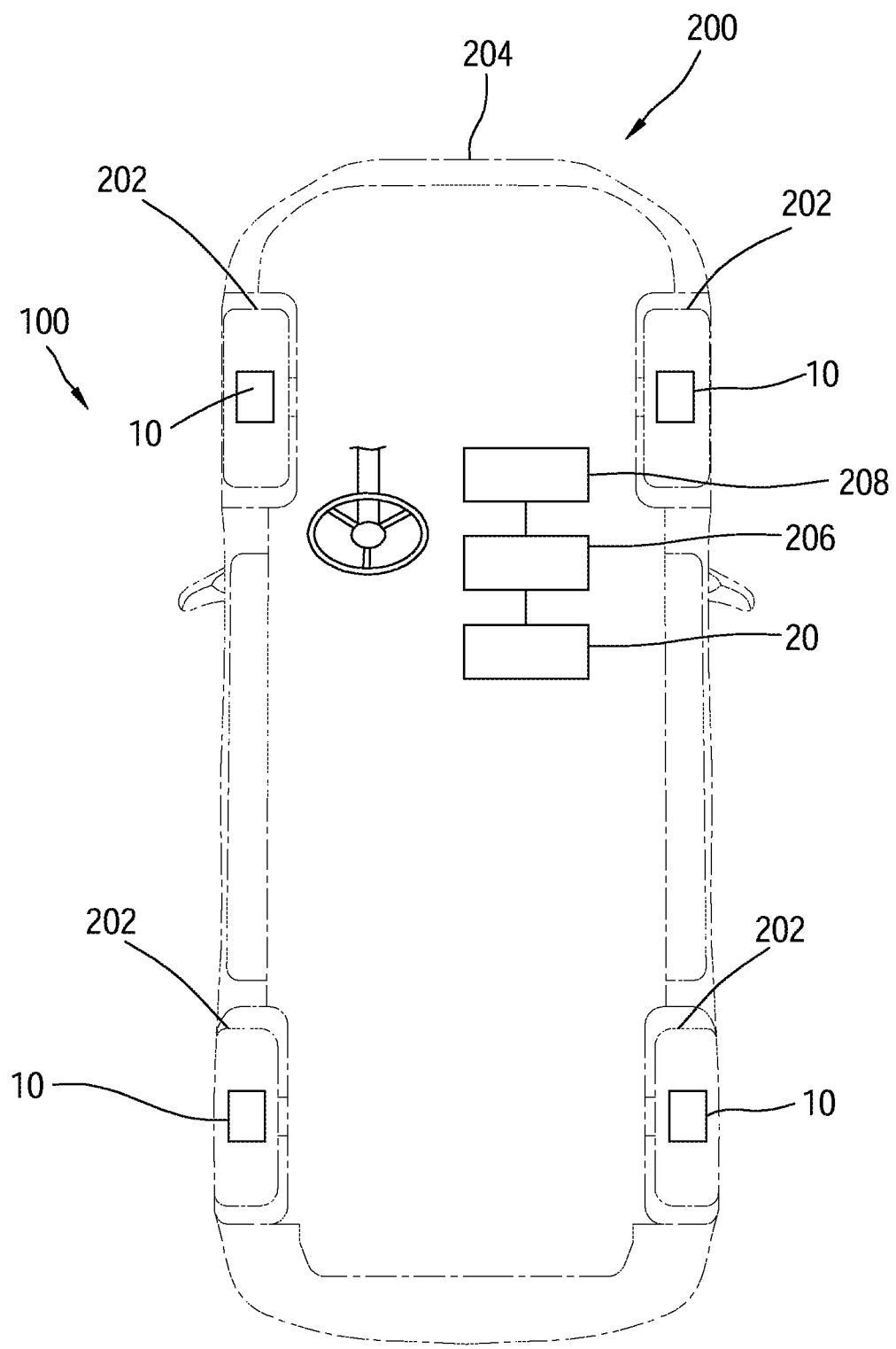
FIG. 1 is a schematic diagram of the wireless monitoring system applied with the method according to a first embodiment of the present invention.

As shown in FIG. 1, a wireless monitoring system 100 applied with a method for monitoring tire condition according to a first embodiment of the present invention includes a plurality of monitoring devices 10 and a receiver 20, wherein the wireless monitoring system 100 is provided in a vehicle 200.

The monitoring devices 10 are respectively provided at different tires 202 of the vehicle 200. Each of the monitoring devices 10 has the same structure, and therefore, only one of the monitoring devices 10 is used for illustration.

Figure 2:
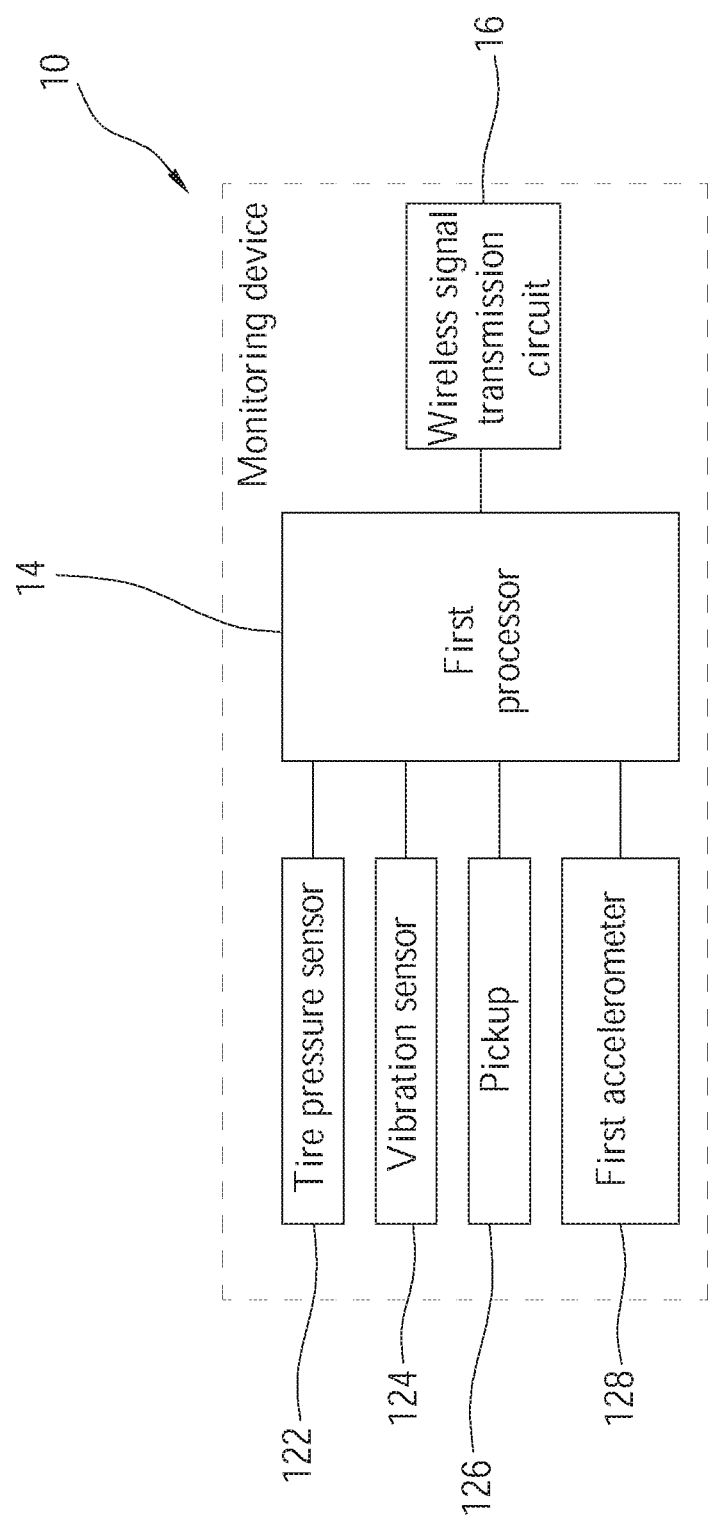
FIG. 2 is a block diagram of the monitoring devices of the first embodiment of the present invention.

As shown in FIG. 2, the monitoring device 10 includes a tire pressure sensor 122, a sensor which is a vibration sensor 124 as an example, a sensor which is a pickup sensor 126 as an example, a sensor which is a first accelerometer (G-sensor) 128 as an example, a first processor 14, and a wireless signal transmission circuit 16. The tire pressure sensor 122 is adapted to sense a tire pressure of the corresponding tire 202. The vibration sensor 124 is adapted to sense a rotation frequency of the corresponding tire 202, and to output an electrical signal corresponding to the sensed rotation frequency. Since the vibration sensor 124 is rotated along with the corresponding tire 202, a frequency of the electrical signal outputted from the vibration sensor 124 equals the rotation frequency of the corresponding tire 202. In addition, the vibration sensor 124 is also adapted to sense a vibration generated by the rotating tire 202. The pickup sensor 126 is adapted to sense a sound of the vibration generated by the rotating tire 202. The first G-sensor 128 is adapted to sense an acceleration of gravity generated by the rotating tire 202. In the current embodiment, the first G-sensor 128 is a triaxial accelerometer, wherein a y-axis is adapted to sense an acceleration of the corresponding tire 202 in an axial direction of a tangent on a circumference of the corresponding tire 202, an x-axis is adapted to sense an acceleration of the corresponding tire 202 in a horizontal axial direction thereof, while a z-axis is adapted to sense an acceleration of the corresponding tire 202 in an axial direction thereof of the corresponding tire 202 perpendicular to the x-axis and the y-axis (i.e., perpendicular to a ground). The first processor 14 wirelessly sends out the tire pressure data through the wireless signal transmission circuit 16.

Figure 3:
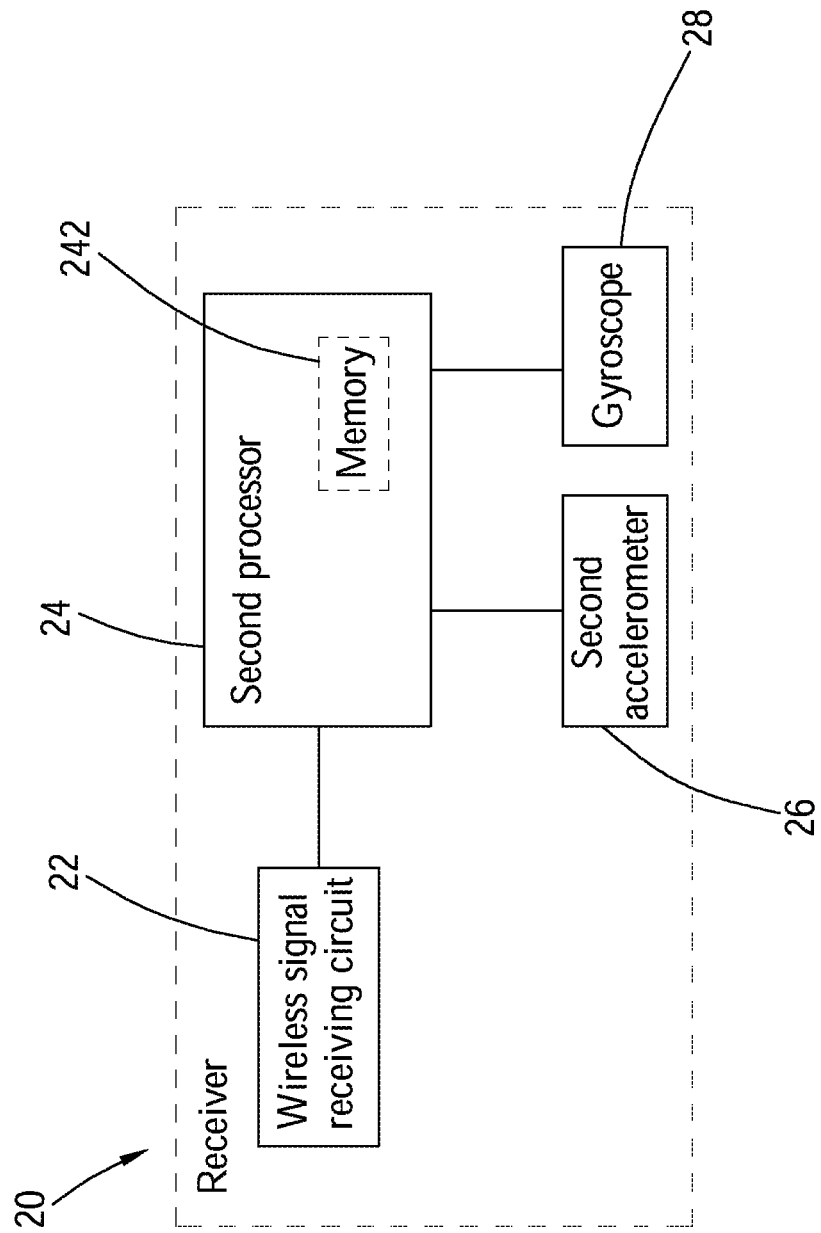
FIG. 3 is a block diagram of the receiver and the vibration sensor of the first embodiment of the present invention.

As shown in FIG. 3, the receiver 20 is provided in a vehicle body 204 of the vehicle 200, wherein the receiver 20 includes a wireless signal receiving circuit 22, a second processor 24, a second accelerometer 26, and a gyroscope 28. The wireless signal receiving circuit 22 is adapted to receive wireless signals transmitted from each of the monitoring devices 10 to obtain the tire pressure data. The receiver 20 is electrically connected to an in-vehicle computer 206 of the vehicle 200 and transmits the received tire pressure data to the in-vehicle computer 206. The received tire pressure data is displayed on a monitor 208. The in-vehicle computer 206 also receives information of the moving vehicle 200, such as a speed of the vehicle 200, a rotational speed of an engine of the vehicle, or a rotating direction of a steering wheel of the vehicle. The second accelerometer 26 is adapted to sense an acceleration generated by vibration of the vehicle body 204. The gyroscope 28 is adapted to sense a moving direction of the vehicle body 204.

Figure 4:
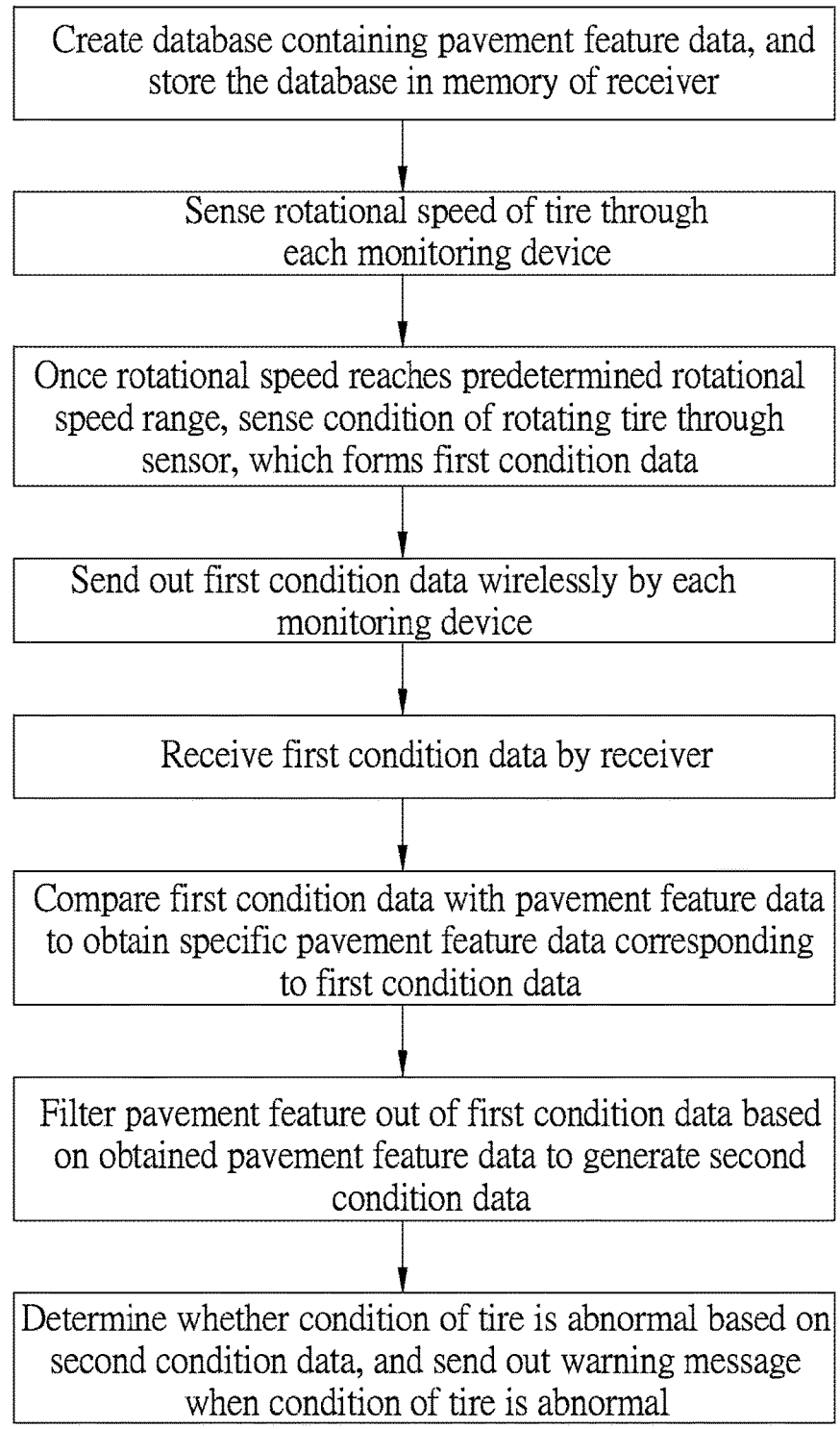
FIG. 4 is a flowchart of the method of the first embodiment.

With the aforementioned structures, the method shown in FIG. 4 could be executed.

First, a database is created and is stored in a memory 242 of the second processor 24. The database contains a plurality of pavement feature data. Each of the pavement feature data corresponds to features related to one specific type of pavement (such as asphalt pavement, concrete pavement, brick pavement, and so on). More specifically, each of the pavement feature data could be obtained by driving the vehicle 200 on different types of pavements to get a practical condition of the tires 202 through the monitoring devices 10 (i.e., the vibration sensor 124, the pickup sensor 126, the first G-sensor 128), and when the vehicle 200 should use new tires, and should be balance corrected and wheel aligned. Each of the pavement feature data contains tire condition data sensed by the monitoring devices 10, such as vibration data sensed by the vibration sensor 124, sound data sensed by the pickup sensor 126, acceleration data sensed by the first G-sensor 128. The pavement feature data obtained from different pavements are different from one another. The pavement feature data could be used as a criterion for comparison.

Then, the monitoring devices 10 sense the rotational speed of at least one of the tires 202 during the running of the vehicle 200. In the first embodiment, the first processor 14 of each of the monitoring devices 10 determines the rotational speed of the corresponding tire 202 according to the frequency of the electrical signals outputted from the vibration sensor 124, wherein the electrical signals could be digital or analog. Once the rotational speed reaches a predetermined rotational speed range, the monitoring devices 10 (i.e., the vibration sensor 124, the pickup sensor 126, the first G-sensor 128) sense the condition of the rotating tires 202 to form first condition data. The first condition data contain first vibration data, first sound data, and first acceleration data, wherein the first vibration data, the first sound data, and the first acceleration data respectively have the pavement features of the pavement that the moving vehicle 200 is currently on. Furthermore, each of the first processors 14 sends out the corresponding first condition data through the wireless signal transmission circuit 16. In practice, the condition of the rotating tire 202 could be sensed and the first condition data could be sent out only within a predetermined period after the rotational speed reaches and stays in the predetermined rotational speed range, wherein the predetermined period could be 10 minutes, for instance. After the predetermined period, the sensing would be stopped to reduce the power consumption of the monitoring devices 10.

The wireless signal receiving circuit 22 of the receiver 20 is adapted to receive each of the first condition data and transmit it to the second processor 24, wherein the second processor 24 compares the received first condition data with the pavement feature data stored in the database. For instance, by analyzing how similar the first vibration data, the first sound data, and the first acceleration data of the first condition data are to vibration data, sound data, and acceleration data of each of the pavement feature data, the one of the pavement feature data which is the most similar to the first condition data could be identified and obtained, and the obtained pavement feature data would be the one corresponding to the received first condition data. Said analysis could find the most similar one through a frequency domain or/and a time domain. Preferably, the vibration data, the sound data, and the acceleration data should be all analyzed, and the one of the pavement feature data which is most similar to the received first condition data in all three aspects would be considered the one corresponding to the pavement that the vehicle 200 is currently on. In other embodiments, there could be only one or two among the vibration data, the sound data, and the acceleration data being compared.

After that, the second processor 24 processes with the obtained pavement feature data and the received first condition data to filter out the pavement features of the received first condition data to generate second condition data containing second vibration data, second sound data, and second acceleration data. In other words, the second vibration data, the second sound data, and the second acceleration data have no relation to the pavement features of the pavement which the moving vehicle 200 is currently on, but merely represent the condition of the tire 202. The second condition data could be used to accurately determine whether the tire 202 is abnormal or not.

Through the second condition data, the second processor 24 could determine what abnormal condition the tire 202 is encountering, such as problems with tire balance, wheel alignment, or tire aging. The detailed method for realizing abnormal conditions in these three aspects will be described below.

1. Tire Balance.

Figure 5:
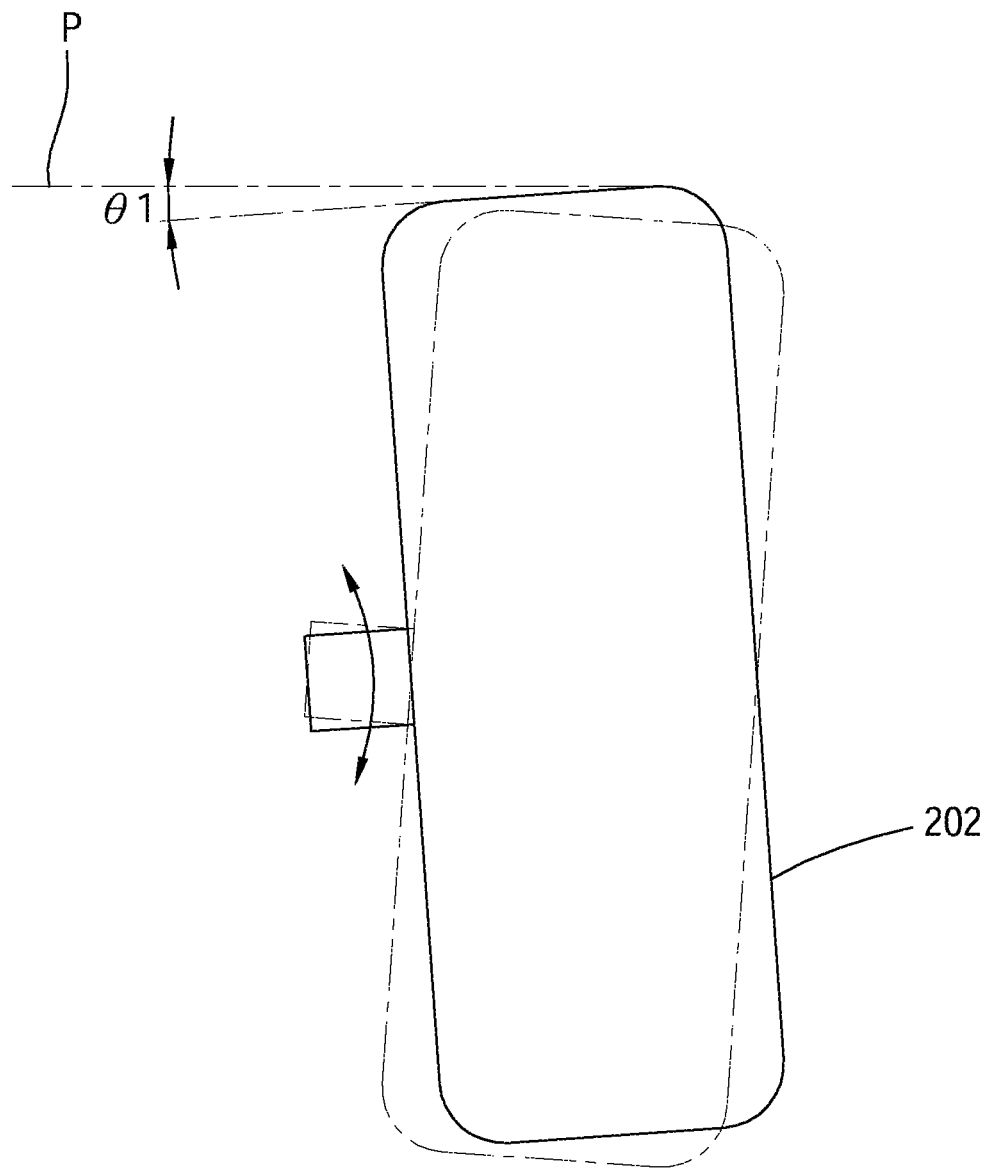
FIG. 5 is a schematic diagram, showing the vibration generated by the unbalanced right front tire.

With inappropriate counterweight, the tires 202 would vibrate while rotating at high speed, which leads the tires 202 to deflect away at a deflection angle θ1 from a reference plane P (a right front tire is illustrated in FIG. 5 as an example), wherein the reference plane P is a plane parallel to a tread of the tire 202 which has been adjusted and balanced.

The second processor 24 determines an acceleration along the x-axis of the rotating tire 202 (i.e., the acceleration of the tire 202 in the horizontal direction) according to the second acceleration data of the second condition data, and derives the deflection angle θ1 corresponding to the tire 202 from the acceleration along the x-axis in the second condition data. Once the deflection angle θ1 is greater than a predetermined angle, the condition of the tire 202 would be determined as abnormal. For instance, when the tire 202 is balanced and parallel to the reference plane P in the horizontal direction, a reference acceleration data of the balanced tire 202 is stored in memory 242 in advance, and then a deflection angle θ1 corresponding the reference plane P in the horizontal direction of the tire 202 could be derived from the comparison between the reference acceleration data and the second acceleration data, wherein the acceleration data along the x-axis used for deriving the deflection angle θ1 could be obtained from the second acceleration data, or could be derived from the acceleration data along the y-axis and the z-axis. In practice, whether the deflection angle θ1 is abnormal or not could be determined via the acceleration along the x-axis of the second acceleration data in the second condition data. For instance, in normal condition, the acceleration in the horizontal direction would vary periodically between +/−1 G; while the deflection angle θ1 is abnormal, the variation of the acceleration in the horizontal direction would be greater than +/−3 G. In other words, if the variation of the acceleration in the horizontal direction of the rotating tire 202 is greater than +/−3 G, the condition of the tire 202 would be determined abnormal.

In addition, if the tire 202 is unbalanced and causes the rotating tire 202 to bounce up and down, an amplitude of the acceleration along the z-axis could be determined based on the acceleration along the z-axis (i.e., perpendicular to the ground) in the second acceleration data of the second condition data, and the condition of the tire 202 would be determined as abnormal when the amplitude exceeds a predetermined range. For instance, while in normal condition, the amplitude of the acceleration along the z-axis would vary periodically between +/−1 G. On the contrary, if the tire 202 is unbalanced and bounces up and down, the condition of the tire 202 would be determined as abnormal when the amplitude of the acceleration along the z-axis exceeds the predetermined range (e.g. +/−3 G).

The tires 202 would vibrate during the running of the vehicle 200 so that the second processor 24 could determine whether a sound generated by the rotating tire 202 is abnormal or not based on the second sound data of the second condition data. In the first embodiment, the second processor 24 could determine whether the condition of the tire 202 is abnormal based on a comparison between the second sound data of the second condition data and a reference sound data which is stored in the memory 242 in advance, wherein the reference sound data is obtained by moving the balanced tire 202 on a flat pavement and filtering out the pavement features of the flat pavement. If the second sound data has a noise which is not contained in the reference sound data, the tire 202 would be determined as unbalanced. In practice, a sound of the second sound data which is out of an audio frequency range could also be filtered out through bandpass filtering to eliminate unnecessary audio frequencies.

Furthermore, the second processor 24 could also determine whether the vibration caused by the tire 202 is abnormal or not based on the second vibration data of the second condition data. In the first embodiment, the second processor 24 could determine whether the condition of the tire 202 is abnormal or not based on a comparison between the second vibration data of the second condition data and reference vibration data which is stored in the memory 242 in advance, wherein the reference vibration data is obtained by moving the balanced tire 202 on a flat pavement and filtering out the pavement features of the flat pavement. If the second vibration data has an abnormal vibration which is not contained in the reference vibration data, the tire 202 would be determined as unbalanced. In practice, a vibration frequency of the second vibration data, which is out of a particular frequency range could also be filtered out through bandpass filtering to eliminate unnecessary vibration frequencies.

In practice, to further eliminate a factor of the pavement for ensuring an accuracy of determining whether the tire 202 is unbalanced or not, the second processor 24 could determine whether the vibration of the vehicle body 204 is abnormal or not based on a comparison between a vibration frequency of the vehicle body 204 sensed through the second accelerometer 26 and a reference vibration frequency stored in the memory 242 in advance. In the first embodiment, if the vibration frequency matches with the reference vibration frequency, the vibration of the vehicle body 204 would be determined as normal. If any one of the following conditions takes place when the vibration of the vehicle body 204 is determined as normal, the condition of the tire 202 would still be deemed abnormal, including:

The deflection angle θ1 is greater than the predetermined angle; the amplitude of the acceleration along the z-axis of the second acceleration data in the vertical direction exceeds the predetermined range; the second sound data has a noise not contained in the reference sound data; and the second vibration data has an abnormal vibration not contained in the reference vibration data. As mentioned, with any one of the above conditions taking place, even when the vibration of the vehicle body 204 is determined as normal, the condition of the tire 202 would still be deemed abnormal.

2. Wheel Alignment.

Figure 6:
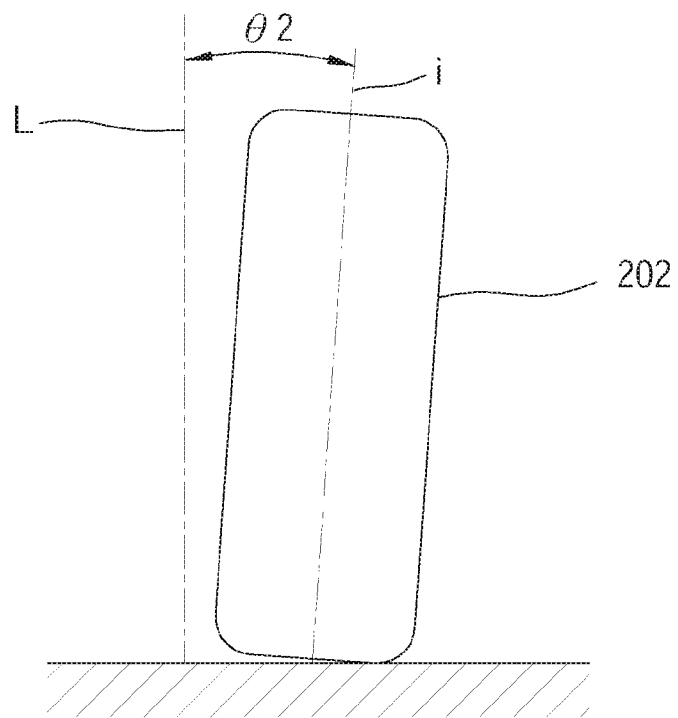
FIG. 6 is a schematic diagram, showing the right front tire has a positive camber angle.
Figure 7:
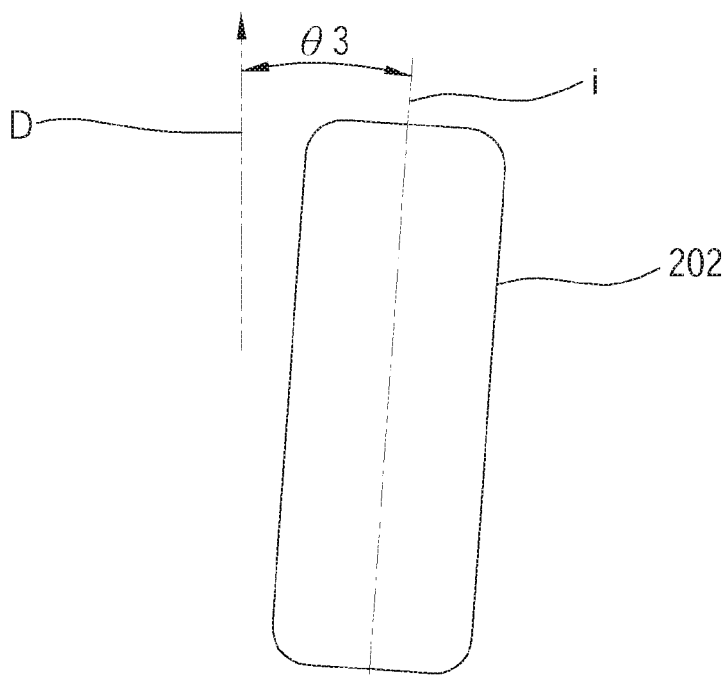
FIG. 7 is a schematic diagram, showing the toe angle of the right front tire has a positive toe angle.

A camber angle θ2 and a toe angle θ3 of the tire 202 are sensed to determine whether the wheel alignment is abnormal or not. As shown in FIG. 6, the camber angle θ2 is defined as an angle between a center line I of the tire 202 and a vertical line L perpendicular to the ground, wherein the tire illustrated in FIG. 6, which is a right front tire, has a positive camber angle. As shown in FIG. 7, the toe angle θ3 is defined as an angle between the center line I of the tire 202 and a moving direction D of the moving vehicle body 204, wherein the tire illustrated in FIG. 7, which is the right front tire again, has a positive toe angle.

The second processor 24 obtains the acceleration of the rotating tire 202 in the z-axis direction based on the second acceleration data of the second condition data, and then estimates the camber angle θ2 of the tire 202 accordingly. The condition of the tire 202 would be determined as abnormal if the camber angle θ2 falls out of a first predetermined angle range, wherein the first predetermined angle range is defined as a range of the camber angle θ2 in a normal condition after the tire 202 is being wheel-aligned. For instance, the first predetermined angle range could be defined as from 0 degree (i.e., the center line I of the tire 202 is perpendicular to the ground) to +10 degrees (i.e., the tire 202 has a positive camber angle of 10 degrees). However, these values are not limitations of the present invention. In practice, the first predetermined angle range could be alternatively defined as negative, or from positive to negative. For instance, after the tire 202 is wheel-aligned, a variation of the acceleration of the tire 202 sensed along the z-axis could be used as a basis and stored in the memory 242. Since the acceleration varies with the camber angle θ2 of the tire 202, the camber angle θ2 of the tire 202 could be derived from the variation of the acceleration. In addition to deriving the camber angle θ2 from the variation of acceleration, the abnormality of the camber angle θ2 could be also realized directly from the sensed acceleration. For instance, the acceleration along the z-axis would vary periodically between +/−1 G in a normal condition. On the contrary, if the camber angle θ2 is abnormal, the variation of the acceleration along the z-axis would be greater than +/−3 G. In other words, if the sensed variation of the acceleration along the z-axis exceeds +/−3 G, the condition of the tire 202 could be determined as abnormal.

The asymmetric camber angle θ2 between the right wheels and the left wheels would lead to poor alignment. Thus, the acceleration data of the corresponding pavement feature data could also be derived from a comparison between the acceleration data of each of the pavement feature data and one of the first acceleration data of the first condition data sensed by the first G-sensor 128 of the monitoring device 10 at each of two corresponding tires 202 (e.g. the left front tire and the right front tire). By filtering out the pavement features of the first acceleration data, the second acceleration data of two of the second condition data could be obtained. After that, the camber angles θ2 of the left front tire and the right front tire could be estimated according to said two of the second acceleration data. The two tires 202 would be determined abnormal when the camber angles θ2 of the two tires 202 are asymmetric. For instance, the tire 202 would be deemed abnormal when one of the tires 202 has a positive camber angle while the other tire 202 has a negative camber angle.

Also, the acceleration along the y-axis could also be derived from the second acceleration data after the pavement features have been filtered out from the first acceleration data sensed by the first G-sensor 128. At the same time, the toe angle θ3 corresponding to the tire 202 could be derived from the acceleration along the y-axis of the second acceleration data and the moving direction D of the vehicle body 204, wherein the moving direction D could be obtained by reading the data sensed by the gyroscope 28 through the second processor 24. The condition of the tire 202 would be determined as abnormal when the toe angle θ3 falls out of a second predetermined angle range, wherein the second predetermined angle range is defined as a range of the toe angle θ3 in a normal condition after the tire 202 being wheel aligned. For instance, the second predetermined angle range could be defined as 0 degree (i.e., the center line I of the tire 202 is parallel to the moving direction D) to +10 degrees (i.e., the center line I of the tire 202 tilts outward relative to the moving direction D by 10 degrees). However, these values are not limitations of the present invention. In practice, the second predetermined angle range could be alternatively defined as negative, or from positive to negative. In addition to deriving the toe angle θ3 from the variation of the acceleration, the abnormality of the toe angle θ3 could be also realized directly from the sensed acceleration. For instance, the acceleration along the y-axis would vary periodically between +/−1 G in a normal condition. On the contrary, if the toe angle θ3 is abnormal, the variation of the acceleration along the y-axis would be greater than +/−3 G. In other words, if the sensed variation of the acceleration along the y-axis of the rotating tire 202 exceeds +/−3 G, the condition of the tire 202 would be determined as abnormal.

As mentioned above, the moving direction D could be obtained by the gyroscope 28, and it could be also obtained according to a steering direction of a steering wheel, for the steering direction corresponds to the moving direction D of the vehicle body 204, and it could be obtained through the in-vehicle computer 206 or a vehicular communication system.

3. Aging Tire.

The second processor 24 determines whether the condition of the tire 202 is abnormal or not by comparing the second sound data with the reference sound data stored in the memory 242, wherein the second sound data is generated by filtering the pavement features out of the first sound data sensed by the pickup sensor 126. For instance, a stiffened rubber of the tire 202 would change a sound frequency of the rotating tire 202, and therefore, the condition of the tire 202 could be determined as abnormal if a frequency of the second sound data differs from that of the reference sound data by a certain extent.

In addition, the second processor 24 could also determine whether the condition of the tire 202 is abnormal by comparing the second vibration data with the reference vibration data stored in the memory 242, wherein the second vibration data is generated by filtering the pavement features out of the first vibration data sensed by the vibration sensor 124. For instance, the stiffened rubber of the tire 202 would change the vibration frequency, and therefore, the condition of the tire 202 would be determined as abnormal if the vibration frequency of the second vibration data differs from that of the reference vibration data by a certain extent.

Once the condition of the tire 202 is determined abnormal by the second processor 24, no matter the abnormality is about tire balancing, wheel alignment, or aging tire, the second processor 24 would send out a warning message to notify the user that the condition of the tire 202 is abnormal. The warning message could be displayed on the monitor 208 through the in-vehicle computer 206 or the vehicular communication system, or could be sent out in a sound form or a light form. Furthermore, the warning message could be different to reflect different abnormal conditions.

In conclusion, the method of the present invention could accurately determine whether the condition of the rotating tire 202 is abnormal through original data of the monitoring devices by filtering the pavement features out of the collected condition data, which would effectively improve the road safety.

It must be pointed out that the embodiments described above are only some embodiments of the present invention. All equivalent methods which employ the concepts disclosed in this specification and the appended claims should fall within the scope of the present invention.

What is claimed is:

1. A method for monitoring a condition of at least one tire of a moving vehicle via a wireless monitoring system disposed in the vehicle, wherein the wireless monitoring system includes at least one monitoring device and a receiver; wherein each one of the at least one monitoring device corresponds to each one of the at least one tire and wherein the corresponding at least one monitoring device is disposed at the at least one tire, and wherein the receiver is disposed in a vehicle body of the vehicle; comprising:
   A. sensing a rotational speed of the at least one tire of the moving vehicle via the at least one monitoring device;
   B. generating first condition data for the at least one tire by sensing the condition of the at least one tire through the at least one monitoring device for a predetermined period while the sensed rotational speed reaches and stays in a predetermined rotational speed range, and stop sensing the condition of the at least one tire after the predetermined period, and wherein the first condition data relates to a pavement feature;
   C. transmitting the first condition data from the at least one monitoring device to the receiver;
   D. comparing the first condition data of the at least one tire with pavement feature data stored in a database to obtain one of the pavement feature data which corresponds to said first condition data, and wherein each of the pavement feature data corresponds to one of a plurality of types of pavements;

E. filtering the pavement feature out of the first condition data based on the obtained pavement feature data to generate second condition data for the at least one tire; and F. determining whether the condition of the at least one tire is abnormal based on the generated second condition data, and sending out a warning message to a user once the condition of the at least one tire is determined as abnormal.

2. The method of claim 1, wherein the at least one monitoring device comprises an accelerometer, which is adapted to sense an acceleration of the at least one tire in a horizontal direction to obtain first acceleration data, which are contained in the relevant first condition data; each of the pavement feature data contains acceleration data; the second condition data of the at least one tire contain second acceleration data; the condition of the at least one tire is determined based on the second acceleration data of the relevant second condition data in step F.

3. The method of claim 2, wherein, in step F, a deflection angle of the at least one tire is derived from the second acceleration data of the relevant second condition data, and once the deflection angle of the at least one tire is greater than a predetermined angle, the condition of said tire is determined as abnormal.

4. The method of claim 3, wherein step F further comprises sensing a vibration frequency of the vehicle body of the vehicle, and determining whether the vibration frequency of the vehicle body is normal by comparing the sensed vibration frequency with a reference vibration frequency; once the deflection angle of the at least one tire is greater than the predetermined angle and the vibration frequency of the vehicle body is determined as normal, the condition of the corresponding tire is determined as abnormal.

5. The method of claim 1, wherein the at least one monitoring device comprises an accelerometer, which is adapted to sense an acceleration of the corresponding tire in a direction perpendicular to a ground to obtain first acceleration data, which are contained in the relevant first condition data; each of the pavement feature data contains acceleration data; the second condition data corresponding to the at least one tire contain second acceleration data; in step F, an amplitude of the acceleration perpendicular to the ground for the at least one tire is determined based on the second acceleration data of the relevant second condition data, and once the amplitude of the at least one tire falls out of a predetermined range, the condition of the tire is determined as abnormal.

6. The method of claim 5, wherein step F further comprises sensing a vibration frequency of the vehicle body of the vehicle, and determining whether the vibration frequency of the vehicle body is normal by comparing the sensed vibration frequency with a reference vibration frequency; once the amplitude of the acceleration perpendicular to the ground of the at least one tire falls out of the predetermined range and the vibration frequency of the vehicle body is determined as normal, the condition of the tire is determined as abnormal.

7. The method of claim 1, wherein the at least one monitoring device comprises an accelerometer, which is adapted to sense an acceleration of the corresponding tire to obtain first acceleration data, which is contained in the relevant first condition data; each of the pavement feature data contains acceleration data; the second condition data of the at least one tire contain second acceleration data; in step F, the condition of the at least one tire is determined based on the second acceleration data of the relevant second condition data.

8. The method of claim 7, wherein step F further comprises determining a moving direction of the vehicle body of the vehicle, and deriving a toe angle of the at least one tire from the moving direction and the second acceleration data of the relevant second condition data; once the toe angle of the at least one tire falls out of a predetermined angle range, the condition of the tire is determined as abnormal.

9. The method of claim 7, wherein step F further comprises deriving a camber angle of the at least one tire from the second acceleration data of the relevant second condition data, and once the camber angle of the at least one tire falls out of a predetermined angle range, the condition of said tire is determined as abnormal.

10. The method of claim 1, wherein the wireless monitoring system comprises at least two monitoring devices, which are accelerometers, and the vehicle comprises at least two tires, which comprise a right tire and a left tire; one of the at least two monitoring devices corresponds to the right tire, and another one of the at least two monitoring devices corresponds to the left tire; the first condition data of each of the at least two tires contain first acceleration data corresponding to an acceleration sensed by the relevant accelerometer; each of the pavement feature data contains acceleration data, and one of the first condition data of one tire among the right tire and the left tire is compared with the pavement feature data in step D; the pavement feature of the first condition data of each of the at least two tires is filtered out based on the pavement feature data obtained in step D to generate the relevant second condition data, which contain second acceleration data; step F further comprises deriving a camber angle of each of the right tire and the left tire from the second acceleration data of the relevant second condition data, and once the camber angles of the right tire and the left tire are asymmetric, the conditions of the right tire and the left tire are determined as abnormal.

11. The method of claim 1, wherein the at least one monitoring device comprises a pickup sensor, which is adapted to sense a sound of the corresponding tire; the first condition data of the at least one tire contain first sound data; each of the pavement feature data contains sound data; the second condition data of the at least one tire contain second sound data; in step F, the condition of the at least one tire is determined by comparing the second sound data of the relevant second condition data with reference sound data stored in the database.

12. The method of claim 1, wherein the at least one monitoring device comprises a vibration sensor, which is adapted to sense a vibration generated by the corresponding tire, wherein the first condition data of the at least one tire comprise first vibration data; each of the pavement features data contains vibration data; the second condition data of the at least one tire contain second vibration data; in step F, the condition of the at least one tire is determined by comparing the second vibration data of the relevant second condition data and reference vibration data stored in the database.

* * * * *